(12) United States Patent
Kotik

(10) Patent No.: US 10,276,846 B2
(45) Date of Patent: Apr. 30, 2019

(54) ELASTIC BLADDER AND BATTERY CELL ASSEMBLIES INCLUDING SAME

(71) Applicants: Bosch Battery Systems, LLC, Orion, MI (US); Robert Bosch GmbH, Stuttgart (DE)

(72) Inventor: Mark Kotik, Rochester Hills, MI (US)

(73) Assignees: Bosch Battery Systems, LLC, Orion, MI (US); Robert Bosch GmbH, Stuttgart (DE)

(*) Notice: Subject to any disclaimer, the term of this patent is extended or adjusted under 35 U.S.C. 154(b) by 461 days.

(21) Appl. No.: 14/873,276

(22) Filed: Oct. 2, 2015

(65) Prior Publication Data

US 2017/0098811 A1 Apr. 6, 2017

(51) Int. Cl.
*H01M 2/18* (2006.01)
*H01M 10/052* (2010.01)
*H01M 10/0585* (2010.01)
*H01M 2/10* (2006.01)
*H01M 10/42* (2006.01)

(52) U.S. Cl.
CPC ..... *H01M 2/1077* (2013.01); *H01M 10/4207* (2013.01)

(58) Field of Classification Search
CPC ....................................... H01M 2/1016–2/1088
See application file for complete search history.

(56) References Cited

U.S. PATENT DOCUMENTS

| | | | |
|---|---|---|---|
| 1,235,648 A | 8/1917 | Bosson et al. | |
| 4,749,891 A | 6/1988 | Sheng | |
| 5,169,733 A | 12/1992 | Savovic et al. | |
| 6,040,085 A | 3/2000 | Cheu et al. | |
| 7,919,203 B2 | 4/2011 | Shibuya et al. | |
| 8,343,642 B2 | 1/2013 | Culver et al. | |
| 8,394,525 B2 | 3/2013 | Maguire et al. | |
| 8,802,264 B2 | 8/2014 | Lin et al. | |
| 2005/0089750 A1 | 4/2005 | Ng et al. | |
| 2012/0129038 A1 | 5/2012 | Lim et al. | |

(Continued)

FOREIGN PATENT DOCUMENTS

DE 102012018091 3/2014
EP 2490278 8/2012

(Continued)

OTHER PUBLICATIONS

PCT International Search Report for PCT/EP2016/072486.
PCT International Search Report for PCT/EP2016/072515.

*Primary Examiner* — Stephan J Essex
(74) *Attorney, Agent, or Firm* — Kelly McGlashen; Maginot Moore & Beck LLP

(57) ABSTRACT

A battery pack includes a battery housing and electrochemical cells disposed in the battery housing in a stacked configuration. Elastic bladders are disposed between adjacent cells of a cell stack. The elastic bladders are configured to serve as a compression spring that provide a predetermined compression force to each cell while accommodating cell growth during use. The elastic bladders may include surface features such as strategically shaped and/or located protrusions or restrained regions that are configured to permit compliance and can be tuned to address the requirements of a specific application and permit application of varying stiffness characteristics across a surface of a cell.

17 Claims, 13 Drawing Sheets

(56) References Cited

U.S. PATENT DOCUMENTS

| | | | |
|---|---|---|---|
| 2013/0017421 A1* | 1/2013 | Onnerud | B60R 21/01 |
| | | | 429/61 |
| 2014/0093760 A1 | 4/2014 | Hermann et al. | |
| 2014/0113171 A1 | 4/2014 | Schaefer | |
| 2014/0141307 A1 | 5/2014 | Christian et al. | |
| 2014/0272518 A1 | 9/2014 | Silk et al. | |
| 2015/0129332 A1 | 5/2015 | Seto et al. | |
| 2016/0221443 A1* | 8/2016 | Yao | B60L 11/1879 |

FOREIGN PATENT DOCUMENTS

| | | | |
|---|---|---|---|
| JP | 2014-010939 | 1/2014 | |
| WO | 2013084290 | 6/2013 | |
| WO | WO-2013084290 A1 * | 6/2013 | H01M 2/1077 |
| WO | 2015141631 | 9/2015 | |

* cited by examiner

ELASTIC BLADDER AND BATTERY CELL ASSEMBLIES INCLUDING SAME

BACKGROUND

1. Field of the Invention

The present application relates to battery packs formed of electrically interconnected cells, and in particular, to lithium (e.g., lithium-ion, lithium-polymer, etc.) cells arranged into modules with elastic bladder elements interposed with the cells.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of electrochemical cells. Although nickel metal hydride (Ni-MH) cells are commonly used to form battery packs for HEV applications, lithium-ion (Li-ion) cells are increasingly used in HEV applications since they provide roughly twice the power and energy density of a Ni-MH cell.

Lithium-ion cells are sometimes provided in a cell housing having a cylindrical or prismatic (rectangular) shape. Alternatively, such cells may be in the form of a so-called pouch cell. Regardless of shape, the cell may include electrodes (for example, a cathode, an anode and an intermediate separator provided in a stacked arrangement) that are rolled in the form of a so-called jelly roll and are placed in the cell housing along with an electrolyte.

To construct a power-producing electrical system, multiple cells are arranged in stacks and are connected electrically in series or in parallel. The voltage of the cell is dependent on the cell chemistry, the current is dependent on the rate of ion transfer between the cathode and anode, and the capacity depends on the total surface area of the cell. To maintain cell capacity over the life of the cell, it is important to maintain a uniform distribution of pressure across a surface of the cell.

However, some cell configurations are subject to cyclical changes in volume as a consequence of variations in the state of charge of the cell. For example, in some instances, the total cell volume may vary as much five to six percent or more during charge and discharge cycling. Thus a need exists for a module assembly structure that can accommodate time-varying cell dimensional changes as well as provide a specified compression force to each cell.

SUMMARY

In some aspects, a battery stack includes a first cell, and a second cell positioned adjacent the first cell in a stacked arrangement with the first cell. The first and second cells each include a cell housing, a positive electrode, and a negative electrode. The positive electrode and the negative electrode are sealed within the cell housing along with an electrolyte. The battery stack includes an elastic member disposed between the first cell and the second cell. The elastic member includes a first sheet, and a second sheet layered with the first sheet. The first sheet and the second sheet are joined along a first sealed line that forms a peripheral edge of the elastic member, and the first sheet and the second sheet are joined along a second sealed line that is spaced apart from the peripheral edge, the second sealed line forming a closed shape. A first interior space is defined between the first sheet, the second sheet, the first sealed line and the second sealed line. In addition, a second interior space is defined between the first sheet, the second sheet and within the second sealed line. One of the first interior space and the second interior space is at least partially inflated, and the other of the first interior space and the second interior space is less inflated than the one of the first interior space and the second interior space.

In some aspects, a battery module includes a cell support element; a first cell supported on the cell support element, and a second cell supported on the cell support element. The second cell is positioned adjacent the first cell in a stacked arrangement with the first cell. The first and second cells each include a cell housing, a positive electrode, and a negative electrode. The positive electrode and the negative electrode are sealed within the cell housing along with an electrolyte. The battery module includes an elastic member disposed between the first cell and the second cell. The elastic member includes a first sheet, and a second sheet layered with the first sheet. The first sheet and the second sheet are joined along a first sealed line that forms a peripheral edge of the elastic member, and the first sheet and the second sheet are joined along a second sealed line that is spaced apart from the peripheral edge, the second sealed line forming a closed shape. A first interior space is defined between the first sheet, the second sheet, the first sealed line and the second sealed line. In addition, a second interior space is defined between the first sheet, the second sheet and within the second sealed line. One of the first interior space and the second interior space is at least partially inflated, and the other of the first interior space and the second interior space is less inflated than the one of the first interior space and the second interior space.

In some aspects, a battery pack includes a battery pack housing; a first cell disposed in the housing, and a second cell disposed in the housing. The second cell is positioned adjacent the first cell in a stacked arrangement. The first and second cells each include a cell housing, a positive electrode, and a negative electrode. The positive electrode and the negative electrode are sealed within the cell housing along with an electrolyte. The battery pack includes an elastic member disposed between the first cell and the second cell. The elastic member includes a first sheet, and a second sheet layered with the first sheet. The first sheet and the second sheet are joined along a first sealed line that forms a peripheral edge of the elastic member, and the first sheet and the second sheet are joined along a second sealed line that is spaced apart from the peripheral edge, the second sealed line forming a closed shape. A first interior space is defined between the first sheet, the second sheet, the first sealed line and the second sealed line. In addition, a second interior space is defined between the first sheet, the second sheet and within the second sealed line. One of the first interior space and the second interior space is at least partially inflated, and the other of the first interior space and the second interior space is less inflated than the one of the first interior space and the second interior space.

The battery stack, the battery module and/or the battery pack may include one or more of the following features: The first interior space is at least partially inflated and the second sealed line surrounds an opening in the elastic element. The second interior space is at least partially inflated and the first interior space lacks inflation. The first sheet and the second sheet are joined along second sealed lines that are spaced apart from the common peripheral edge, each second sealed line defining a second interior space, wherein all of the all of the second interior spaces have the same shape. The first sheet and the second sheet are joined along second sealed lines that are spaced apart from the common peripheral edge, each second sealed line defining a second interior space, wherein all of the all of the second interior spaces have the same size. The second interior spaces are distributed uniformly across an area defined by the peripheral edge. The second interior spaces are concentrated in a central region of an area defined by the peripheral edge. The elastic member is configured to apply a compression force to a surface of the cell housing of each of the first cell and the second cell. The elastic member is configured such that the applied compression force is greater in a central region of the surface than in a peripheral region of the surface. The elastic member is free of a fluid inlet and a fluid outlet.

In some aspects, a battery module includes a stacked arrangement of prismatic lithium-ion cells with interposed elastic members that are designed to accommodate cyclic volumetric expansion of the cell as well as provide a specified compression force to each cell.

The elastic members can be manufactured using common and relatively low cost manufacturing processes including, but not limited to, metal stamping, plastic sheet forming, sheet welding to form fluid filled bladders, etc. In addition, the elastic members provide a low-cost, light-weight compliant structural member in the battery module that permits cell growth while maintaining a required cell compression force over the life of the battery in order to enable maximizing the lifetime of the battery cell.

In some embodiments, the elastic member is formed of two sheets of material that are bonded together along one or more sealed lines or otherwise connected at strategic locations, and filled with fluid to form an elastic bladder. The elastic bladder is used as a compression spring between adjacent battery cells. The elastic bladder uses the compression of the fluid and the resiliency and elasticity of the sheets of material to provide a predictable compression force on the cells.

The elastic members are fluid-filled bladders that include features such seal lines that form restrained regions defining protrusions that contact the cell housing when the elastic member is positioned adjacent the cell. In some embodiments, the protrusions may be equally distributed about a surface of the elastic member so as to provide a uniformly distributed compression force to the cell surface. In other embodiments, the elastic member may have protrusions that are strategically arranged over a surface of the cell to accommodate cell housing expansion. For example, in cases where the expansion of the prismatic cell housing is non-uniform across a surface of the cell, the protrusions may be unequally distributed over the surface of the elastic member. In some embodiments, the number of protrusions and/or the stiffness of the protrusions is increased in a central region of the elastic member relative to a peripheral region of the elastic member to address relatively larger expansion in a central region of the surface of the cell. The stiffness of the elastic member may be adjusted by changing a size and/or geometry of the protrusions.

DETAILED DESCRIPTION

Figure 1:
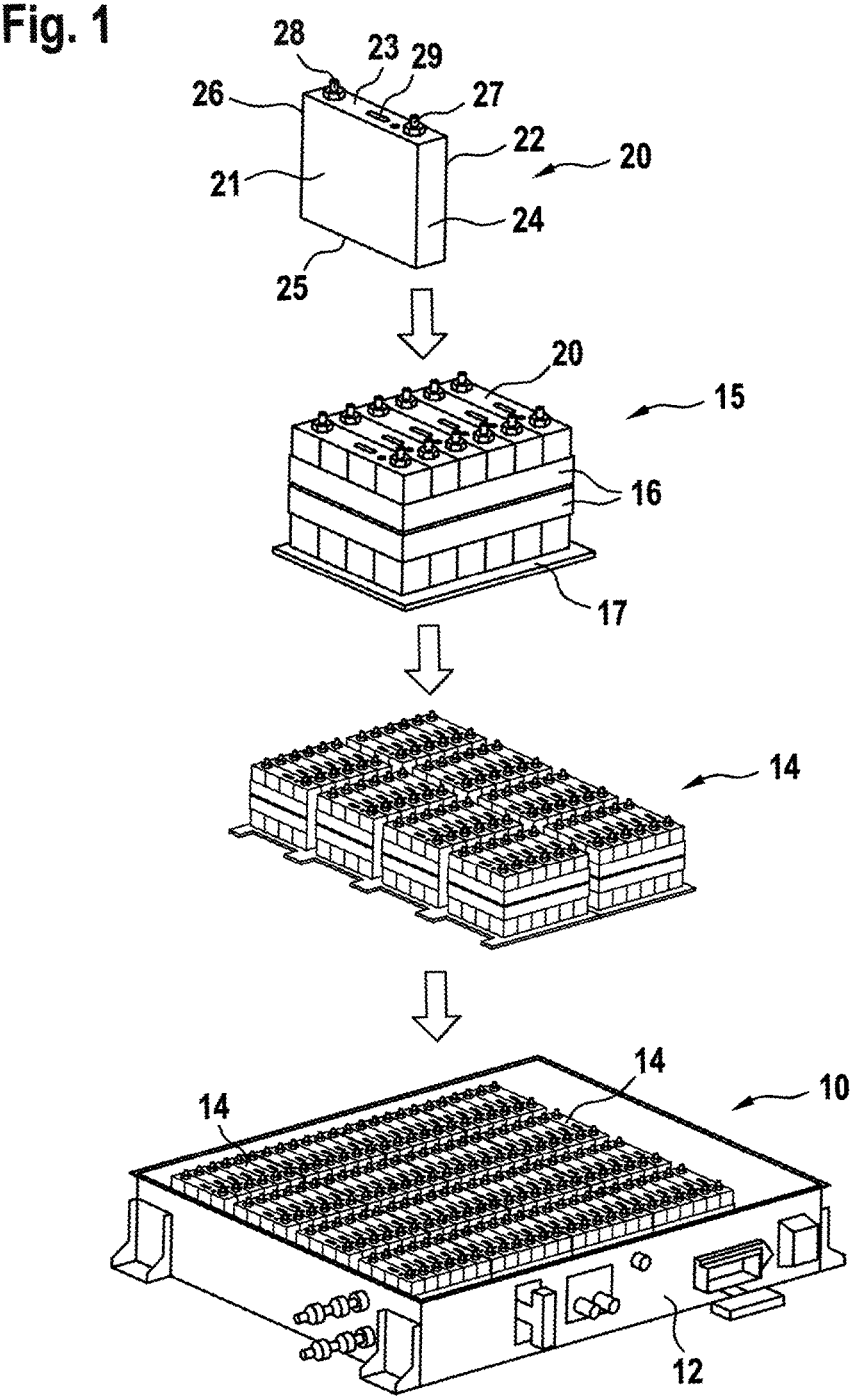
FIG. 1 is an exploded perspective view of a battery pack.

Referring to FIG. 1, a battery pack 10 used to provide electrical power includes prismatic electrochemical cells 20 that are electrically interconnected and stored in an organized manner within a battery pack housing 12. The term "prismatic" as used herein refers to having a rectangular shape. The cells 20 are arranged in a side-by-side configuration to form a stack 18, and several cells 20 in the stacked arrangement are bundled together to form a battery module 15. Within the battery module 15, the stacked group of cells 20 may be commonly supported on a support plate 17 and bound together under compression via a band 16. Although the illustrated embodiment of the battery module 15 includes six cells 20, battery modules 15 may include a greater or fewer number of cells 20. Several battery modules 15 are collected into subunits 14, and several subunits 14 are arranged within the battery pack housing 12. An elastic member 30 is disposed between each cell 20 of the stack 18 to maintain a compression force on the cells 20 and to allow the cells 20 to expand and contract during charge and discharge in a controlled manner, as discussed further below.

The cells 20 are prismatic lithium-ion cells. Each cell 20 includes a cell housing 19. An electrode assembly (not shown) is sealed within the cell housing 19 along with an electrolyte to form a power generation and storage unit. The electrode assembly may be a "jelly roll" electrode assembly that includes a positive electrode, a negative electrode and an intermediate separator provided in a stacked and rolled arrangement.

Each cell housing 19 includes a first side 21 and a second side 22 opposed to the first side 21. The first and second sides 21, 22 correspond to the broad sides of the rectangular cell housing 19. The cell housing 19 also includes four relatively narrow end surfaces 23, 24, 25, 26 that extend between the first side 21 and the second side 22. In the illustrated embodiment, a first end surface 23 and a third end surface 25 are on opposed sides of the cell 20 and are longer than a second end surface 24 and a fourth end surface 26. The second and fourth end surfaces 24, 26 extend perpendicular to the first and third end surfaces 23, 25. Each cell 20 includes terminals 27, 28 that protrude from the first end surface 23. Each cell 20 also includes a vent 29 that opens through the first end surface 23.

Figure 2:
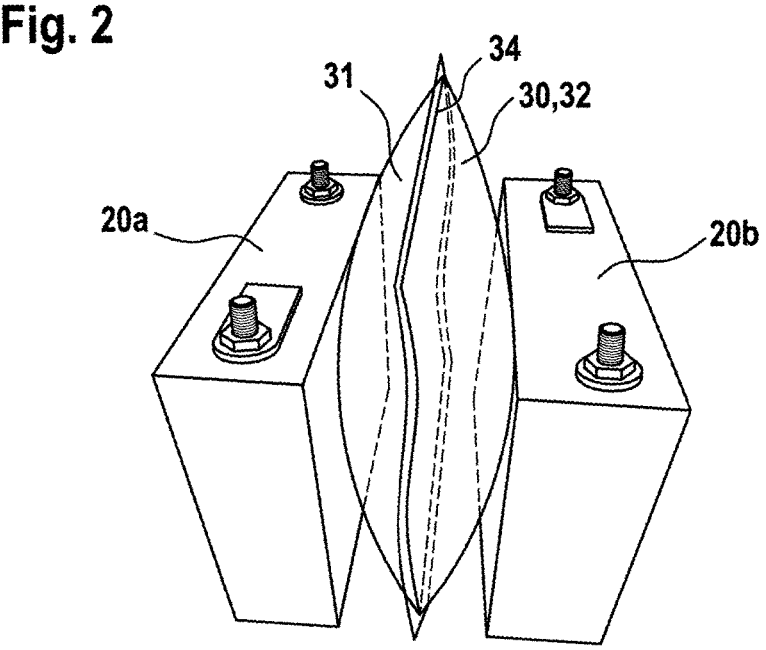
FIG. 2 is a perspective view of an elastic member disposed between two cells.
Figure 3:
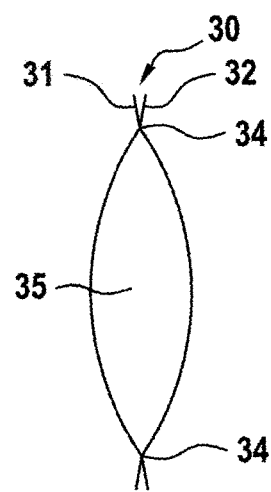
FIG. 3 is a cross-sectional view of the elastic member of FIG. 2.

Referring to FIGS. 2-3, the elastic member 30 is a fluid-filled bladder. The elastic member 30 serves as a compression spring, and includes a first sheet 31 and a second sheet 32 layered with the first sheet 31. The first sheet 31 and the second sheet 32 are joined along a sealed line 34 that forms a peripheral edge of the elastic member 30. The sealed line 34 encloses an area that is the same shape as the area of the cell first and second sides 21, 22, and is in a range of 80 percent to 120 percent of the area of the cell first and second sides 21, 22. In some embodiments, the sealed line 34 encloses an area that is about 100 percent of the area of the cell first and second sides 21, 22. The sealed line 34 may be formed using known methods including heating, welding or adhesives. An interior space 35 defined within the sealed line 34 is filled with a fluid such as air to an extent that the first sheet 31 is spaced from the second sheet 32 at interior locations spaced apart from the sealed line 34. The fluid is captured within the interior space 35 at the time of manufacture, and the elastic member 30 is free of fluid inlets and outlets.

Figure 4:
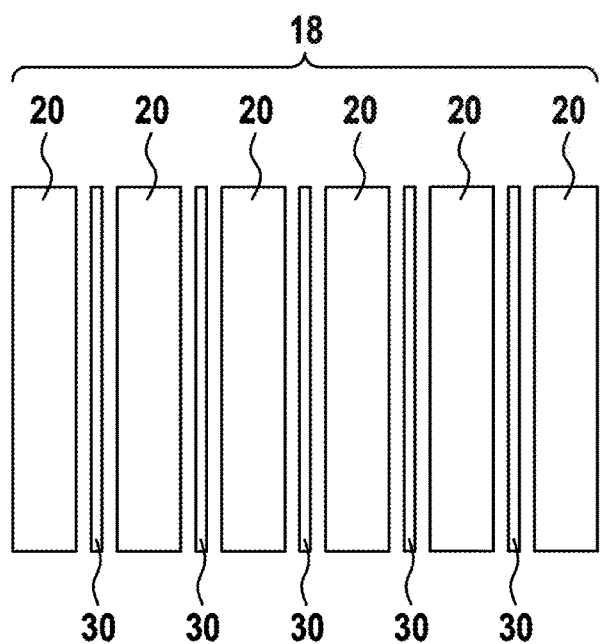
FIG. 4 is a schematic view of a cell stack with elastic members interposed between adjacent cells.
Figure 5:
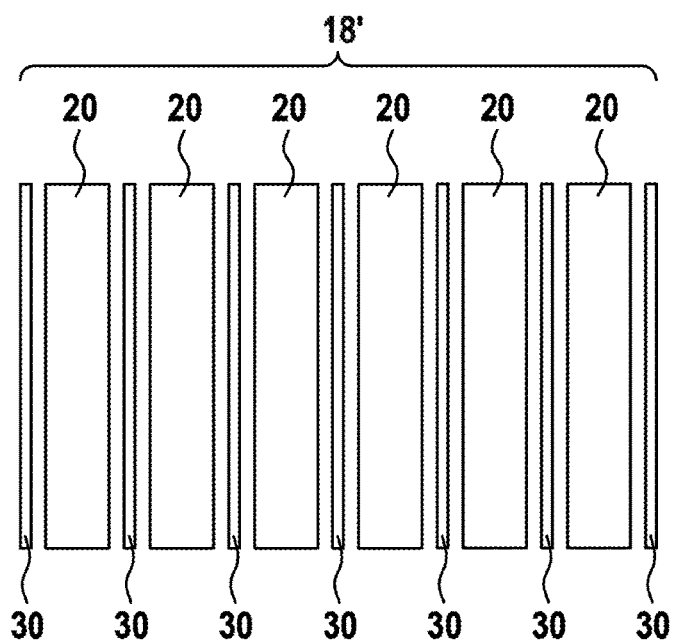
FIG. 5 is a schematic view of a cell stack with elastic members interposed between adjacent cells and disposed on each end of the cell stack.

Referring to FIGS. 4-5, the elastic member 30 is disposed between each cell 20 of a stack 18 to maintain a compression force on the cells 20 and to allow the cells 20 to expand and contract during charge and discharge in a controlled manner. The elastic member 30 leverages the compression of the fluid and the resiliency and elasticity of the sheet material to provide a predictable and uniform compression force on the cells 20. For a battery module 15 containing a stack 18 of six cells 20, the battery module 15 would include five elastic members 30, one elastic member 30 disposed between each adjacent pair of cells 20 (FIG. 4). In other embodiments, in addition to including one elastic member 30 disposed between each adjacent pair of cells 20, a battery module 15 may also include an elastic member 30 disposed on an outward facing side of each outermost cell 20 of the stack 18 (FIG. 5). In this configuration, the outermost elastic members 30 may be supported by an adjacent structural member such as a battery module band 17, the outermost cell 20 of an adjacent battery module 15, an inner surface of the battery pack housing, etc.

Figure 6:
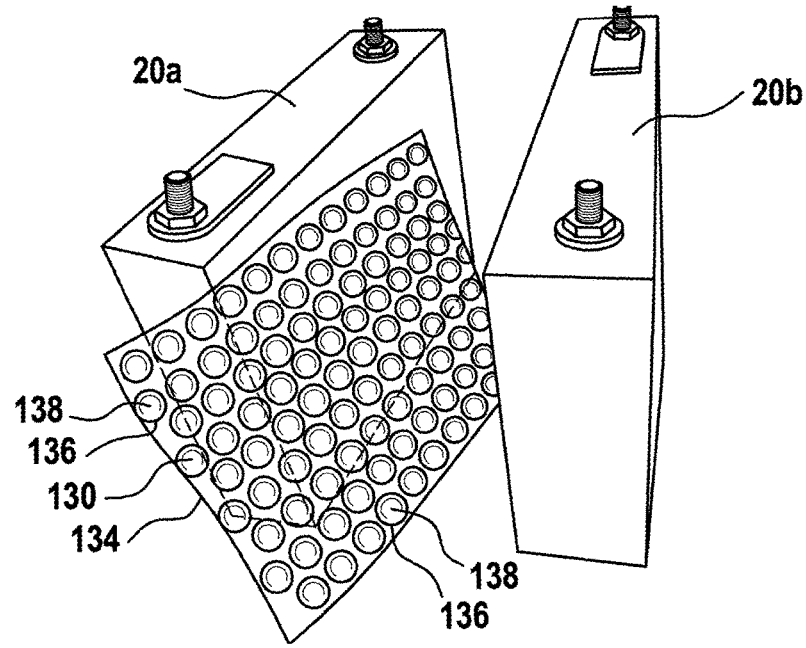
FIG. 6 is a perspective view of another embodiment elastic member disposed between adjacent cells.
Figure 7:
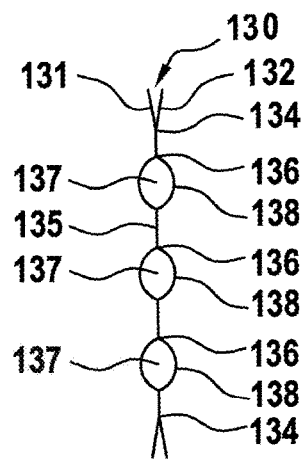
FIG. 7 is a cross-sectional view of the elastic member of FIG. 6.

Referring to FIGS. 6-7, an alternative embodiment elastic member 130 is a bladder that is restrained at the perimeter and in strategic locations within the perimeter. For example, the elastic member 130 is formed of a plurality of fluid filled bladders 138 joined by webbing. Like the elastic member 30, the elastic member 130 serves as compression spring, and includes a first sheet 131 and a second sheet 132 layered with the first sheet 131. The first and second sheets 131, 132 are formed of a resilient, elastic material. The first sheet 131 and the second sheet 132 are joined along a first sealed line 134 that forms a peripheral edge of the elastic member 130. The first sealed line 134 encloses an area that is the same shape as the area of the cell first and second sides 21, 22, and is in a range of 80 percent to 120 percent of the area of the cell first and second sides 21, 22. In some embodiments, the first sealed line 134 encloses an area that is about 100 percent of the area of the cell first and second sides 21, 22. The first sheet 131 and the second sheet 132 are joined along a second sealed line 136 that is spaced apart from the first sealed line 134. The second sealed line 136 forms a closed shape such as a circle (shown) or a rectangle. The first and second sealed lines 134, 136 may be formed using known methods including heating, welding or adhesives.

A first interior space 135 is defined between the first sheet 131, the second sheet 132, the first sealed line 134 and the second sealed line 136. In addition, a second interior space 137 is defined between the first sheet 131, the second sheet 132 and within the second sealed line 136. In the embodiment illustrated in FIG. 5, the second interior space 137 is at least partially inflated forming the fluid filled bladder 138, and the first interior space 135 is free of inflation providing a webbing that surrounds the fluid filled bladder 138. The elastic member 130 includes several uniformly and closely spaced second sealed lines 136, each defining a second interior space 137 corresponding to a fluid filled bladder 138.

In the illustrated embodiment, the fluid filled bladders 138 each have the same shape and size, and are uniformly distributed within the area defined by the first sealed line 134. However, the fluid filled bladders 138 are not limited to this configuration. In some embodiments, the fluid filled bladders 138 are shaped, sized, and/or distributed to provide non-uniform spring characteristics over the area defined by the first sealed line 134. For example, since the prismatic cell 20 tends to experience greater distortion in a central region of the cell first and second sides 21, 22 relative to a periphery of the cell first and second sides 21, 22, the elastic member 130 may be configured to provide a greater concentration of fluid filled bladders 138 in a central region of the elastic member 130 than in a peripheral region. Alternatively, or additionally, the elastic member 130 may be configured to provide fluid filled bladders 130 that are more stiff in a central region than those in a peripheral region, for example by tuning the shape and/or size of the fluid filled bladders 130 according to location.

In some embodiments, the first sealed line 134 is omitted, and the first interior space 135 is defined between the first sheet 131, the second sheet 132, a peripheral edge of the elastic member 130 and the second sealed line 136. In such embodiments, the first interior space 135 is open along the peripheral edge, and is at atmospheric pressure.

Figure 8:
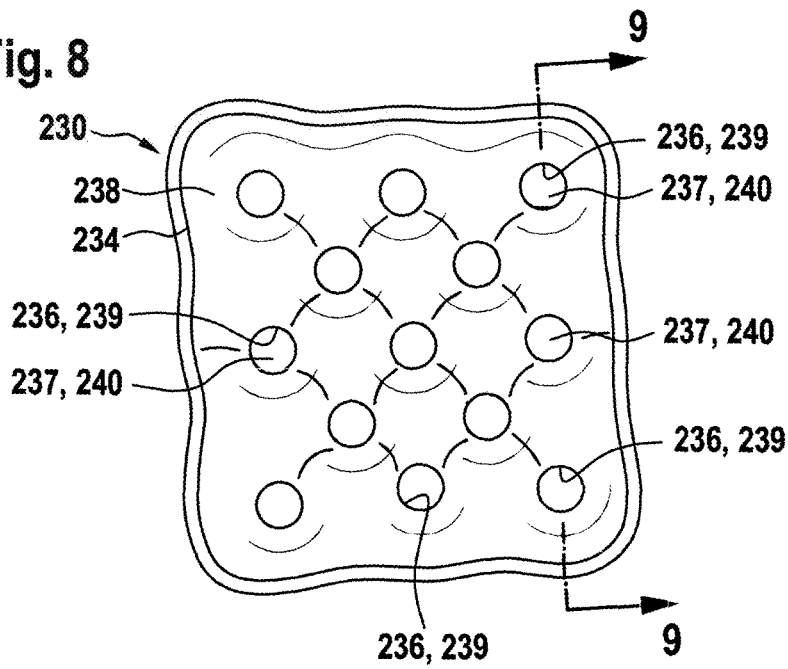
FIG. 8 is a perspective view of another embodiment elastic member.
Figure 9:
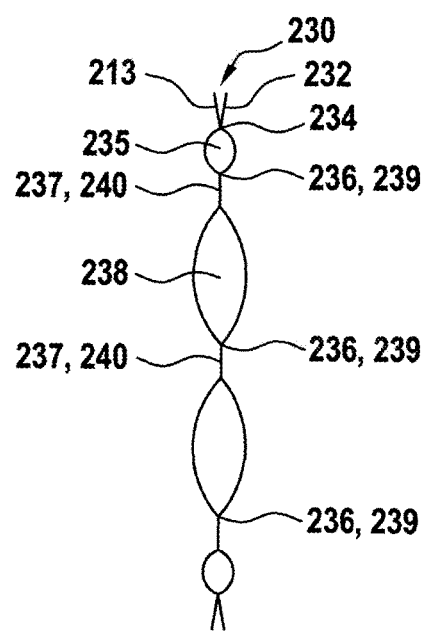
FIG. 9 is a cross-sectional view of the elastic member of FIG. 8 as seen along line 9-9 of FIG. 8.

Referring to FIGS. 8-9, another alternative embodiment elastic member 230 is a bladder that is restrained at the perimeter and in strategic locations within the perimeter. For example, the elastic member 230 is a single fluid filled bladder 238 having a plurality of restrained regions within the perimeter. Like the elastic member 30, the elastic member 230 serves as compression spring, and includes a first sheet 231 and a second sheet 232 layered with the first sheet 231. The first and second sheets 231, 232 are formed of a resilient, elastic material. The first sheet 231 and the second sheet 232 are joined along a first sealed line 234 that forms a common peripheral edge of the elastic member 230. The first sealed line 234 encloses an area that is the same shape as the area of the cell first and second sides 21, 22, and is in a range of 80 percent to 120 percent of the area of the cell first and second sides 21, 22. In some embodiments, the first sealed line 234 encloses an area that is about 100 percent of the area of the cell first and second sides 21, 22. The first sheet 231 and the second sheet 232 are joined along a second sealed line 236 that is spaced apart from the first sealed line 234. The second sealed line 236 forms a closed shape such as a circle (shown) or a rectangle and provides a restrained region 239 within the fluid filled bladder 238. The first and second sealed lines 234, 236 may be formed using known methods including heating, welding or adhesives.

A first interior space 235 is defined between the first sheet 231, the second sheet 232, the first sealed line 234 and the second sealed line 236. In addition, a second interior space 237 is defined between the first sheet 231, the second sheet 232 and within the second sealed line 236. One of the first interior space 235 and the second interior space 237 is at least partially inflated, and the other of the first interior space 235 and the second interior space 237 is less inflated than the one of the first interior space 235 and the second interior space 237. In the embodiment illustrated in FIG. 8, the first interior space 235 is at least partially inflated forming the fluid filled bladder 238, and the second interior space 237 is free of inflation. In addition, the material corresponding to the second interior space 237 may be removed, forming openings 240 in the elastic member 230. In other embodiments (not shown), the material corresponding to the second interior space 237 remains intact and may lack inflation. The elastic member 230 includes several uniformly spaced second sealed lines 236, each defining a second interior space 237 corresponding to a restrained region 239.

In the illustrated embodiment, the restrained regions 239 each have the same shape and size, and are uniformly distributed within the area defined by the first sealed line 234. However, the restrained regions 239 are not limited to this configuration. In some embodiments, the restrained regions 239 are shaped, sized, and or distributed to provide non-uniform spring characteristics over the area defined by the first sealed line 234. For example, the elastic member 230 may be configured to provide a greater concentration of the restrained regions 239 in a central region of the elastic member 230 than in a peripheral region. Alternatively, or additionally, the elastic member 230 may be configured to be more stiff in a central region than those in a peripheral region, for example by tuning the shape and/or size of the restrained regions 239 according to location.

The first and second sheets 31, 32, 131, 132, 231, 232 are formed of a resilient, elastic material. For example, the material used to form the first and second sheets may selected from the group including, but not limited to, rubber (natural rubber based material), elastomer (synthetic rubber material), and polymer (plastic).

Figure 10:
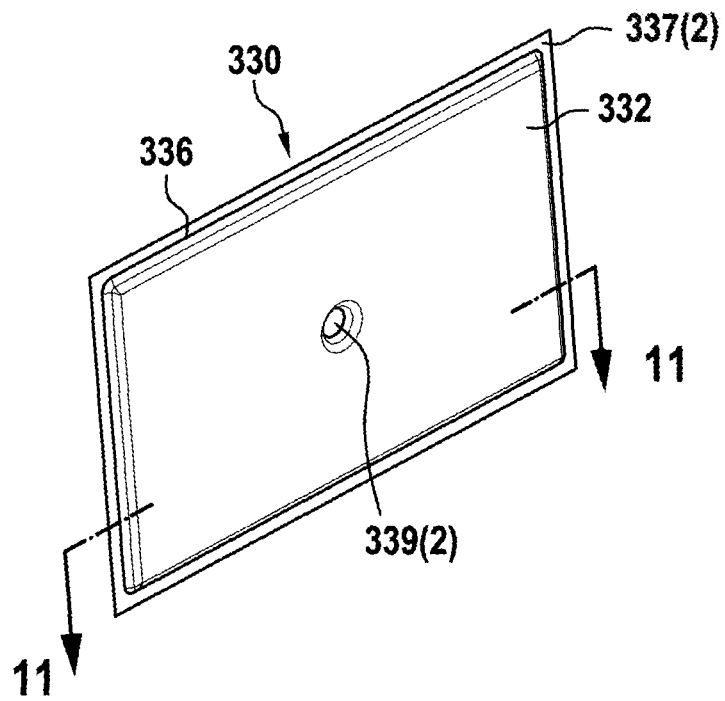
FIG. 10 is a perspective view of another embodiment elastic member.
Figure 11:
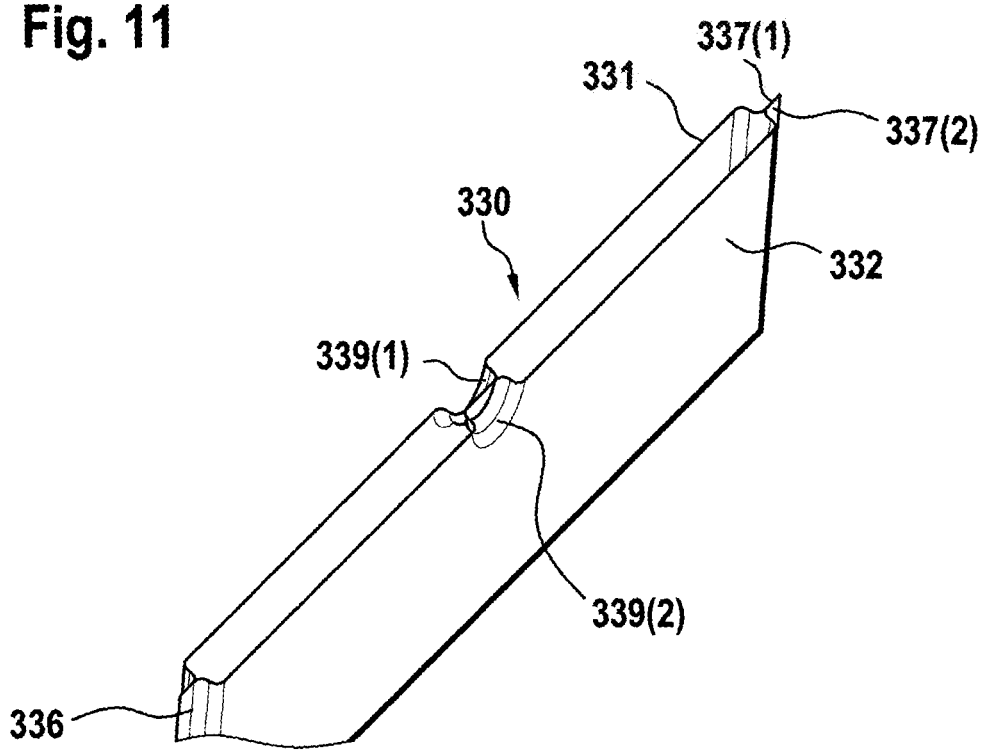
FIG. 11 is a cross sectional view of the elastic member of FIG. 10 as seen along line 11-11 of FIG. 10.
Figure 12:
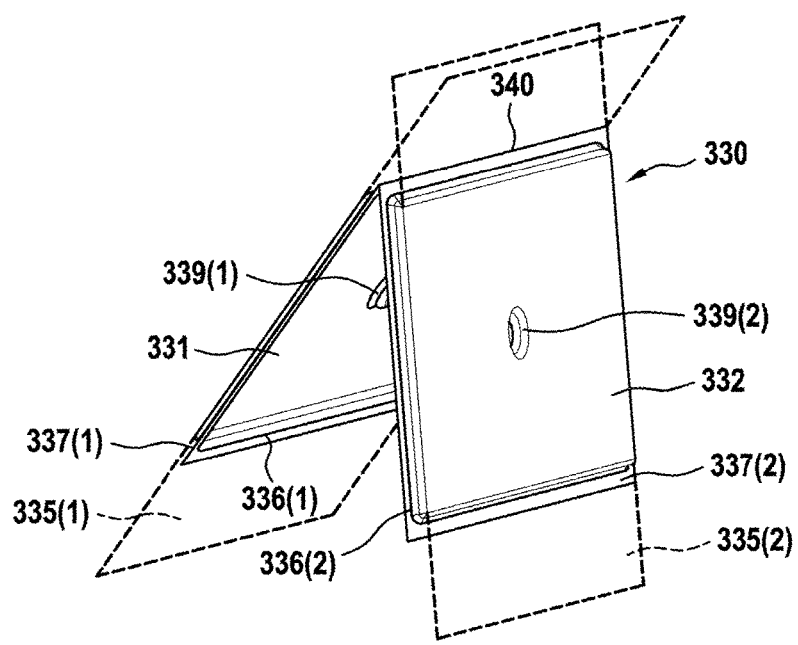
FIG. 12 is a perspective view of the elastic member of FIG. 10 in a partially folded configuration.

Referring to FIGS. 10-12, another alternative embodiment elastic member 330 is a bladder that is formed of a pair of plate portions 331, 332 that cooperate to form a bellows-type compression spring. The first plate portion 331 is substantially similar in form to the second plate portion 332, whereby only the first plate portion 331 will be described in detail, and common reference numbers will be used to refer to common elements.

The first plate portion 331 is rectangular in size and shape to conform to the size and shape of the cell first and second sides 21, 22. The first plate portion 331 defines a plane 335 and includes offset regions 337, 339 that are non-coplanar with the plane 335. In particular, the first plate portion 331 includes a peripheral flange 337 that is offset from and parallel to the plane 335. The flange 337 surrounds a peripheral edge 336 of the first plate portion 331. In addition, the first plate portion 331 includes a protrusion 339 that protrudes from the plane 335 a distance corresponding to the offset of the flange 337, and in the same direction as the offset of the flange 337. The protrusion 339 is a single protrusion that is centered within the area defined by the peripheral edge 336 of the first plate portion 331.

The second plate portion 332 is layered with the first plate portion 331 in a stacked configuration. In addition, the second plate portion 332 is arranged in a mirrored orientation relative to the first plate portion 331 so that the first plate portion flange 337(1) contacts the second plate portion flange 337(2), the first plate portion protrusion 339(1) contacts the second plate portion protrusion 339(2), and the first plate portion plane 335(1) is spaced apart from the second plate portion plane 335(2). This configuration forms a bellows that allows for compliance when the elastic member 330 is disposed between adjacent cells 20. In addition, the central protrusions 339(1), 339(2) provide some stiffness to the bellows arrangement, which can be adjusted by adjusting the shape and/or size of the protrusions 339(1), 339(2).

Although the embodiment illustrated in FIGS. 10-12 includes plate portions 331, 332 having a single protrusion 339(1), 339(2) that is centered within a periphery of the respective plate portion 331, 332, the elastic member 330 is not limited to having a single, centered protrusion 339(1), 339(2). For example, in some embodiments, the elastic member 330 includes plate portions 331, 332 having multiple protrusions 339(1), 339(2) that are uniformly distributed across an area surrounded by the respective flanges 337(1), 337(2). In other embodiments, the elastic member 330 includes plate portions 331, 332 having multiple protrusions 339(1), 339(2) that are concentrated in a central region of the area surrounded by the respective flanges 337(1), 337(2).

In some embodiments, the first plate portion 331 is formed separately from, and is not joined to, the second plate portion 332. As a result, the first plate portion 331 is movable relative to the second plate portion 332.

In other embodiments, the first plate portion 331 is formed separately from, and is subsequently joined to, the second plate portion 332. For example, the first plate portion 331 may be connected to the second plate portion 332 along all contacting surfaces (e.g., along the flange 337 and protrusion 339), or alternatively, at strategic portions of the contacting surfaces for example in a spot welding process. As a result, the contacting surfaces of first plate portion 331 are fixed relative to those of the second plate portion 332.

In still other embodiments, the first plate portion 331 is formed along with the second plate portion 332 from a single piece of material, for example in a stamping operation. In this embodiment, the first plate portion 331 shares a portion of a peripheral edge 336 with the second plate portion 332. The shared edge portion serves as a fold line 340, and in use the elastic member 330 is folded along the fold line 340 so that the first plate portion 331 overlies the second plate portion 332 (see FIG. 12, which illustrates a partially folded configuration of the elastic member 330).

Figure 13:
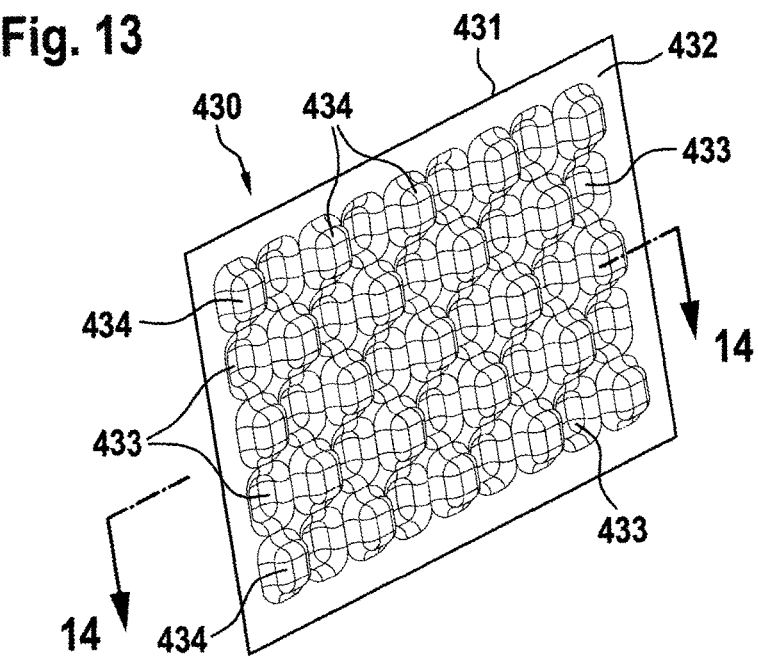
FIG. 13 is a perspective view of another embodiment elastic member.
Figure 14:
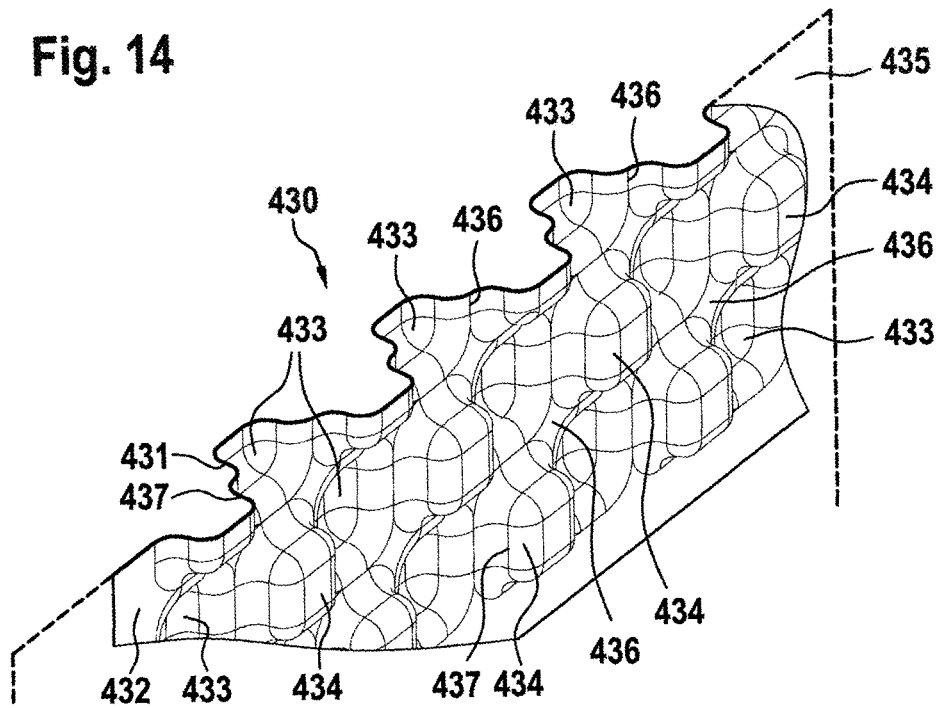
FIG. 14 is a cross-sectional view of the elastic member of FIG. 13 as seen along line 14-14 of FIG. 13.

Referring to FIGS. 13-14, another alternative embodiment elastic member 430 is a plate (e.g., a single-thickness sheet) that is formed having a curved or wavy contour when seen in cross-section. Like the previously described embodiments, the elastic member 430 serves as compression spring. The elastic member 430 defines a continuous (e.g., non-perforated) surface that conforms to the shape and size of the cell first and second sides 21, 22. In particular, the elastic member 430 includes a first side 431, and a second side 432 that is opposed to the first side 431. The elastic member 430 includes an array of first protruding regions 433 and an array of second protruding regions 434. Each first protruding region 433 is a protrusion that protrudes outwardly from the first side 431 and coincides with a depression formed in the second side 432. Similarly, each second protruding region 434 is a protrusion that protrudes outwardly from the second side 432 that coincides with a depression formed in the first side 434.

The elastic member 430 generally resides within a plane 435. The first protruding regions 433 protrude out of the plane 435 in a first direction (e.g., in a direction normal to the first side 431), and the second protruding regions 434 protrude out of the plane 435 in a direction opposed to the first direction. The first protruding regions 433 and the second protruding regions 434 are spaced apart from each other, and the portions of the elastic member 430 intermediate the protruding regions 433, 434 reside in the plane 435, and are referred to as "intermediate regions" 436.

Figure 15:
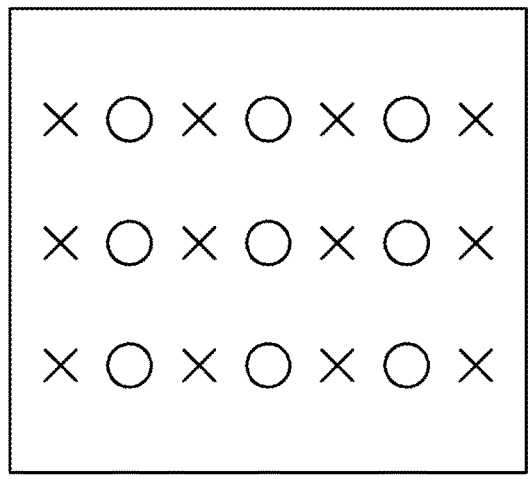
FIG. 15 is a schematic illustration of an alternative arrangement of the protruding regions of FIG. 13.

In some embodiments, the first protruding regions 433 are arranged in a grid pattern defined by rows and columns, and each second protruding region 434 is disposed along the rows and columns so as to alternate with adjacent first protruding regions. This configuration is shown schematically in FIG. 15, in which an "o" represents a first protruding region 433, and an "x" represents a second protruding region 434.

Figure 16:
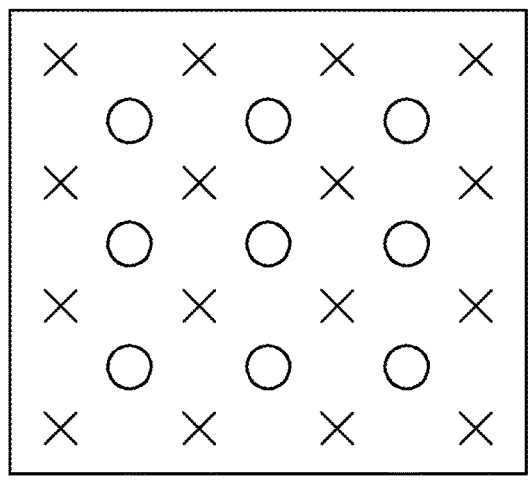
FIG. 16 is a schematic illustration of another alternative arrangement of the protruding regions of FIG. 13.

Referring to FIG. 16, in other embodiments, the first protruding regions 433 are arranged in a grid pattern defined by rows and columns, and each second protruding region 434 is disposed in an interstitial space between adjacent first protruding regions 433.

Figure 17:
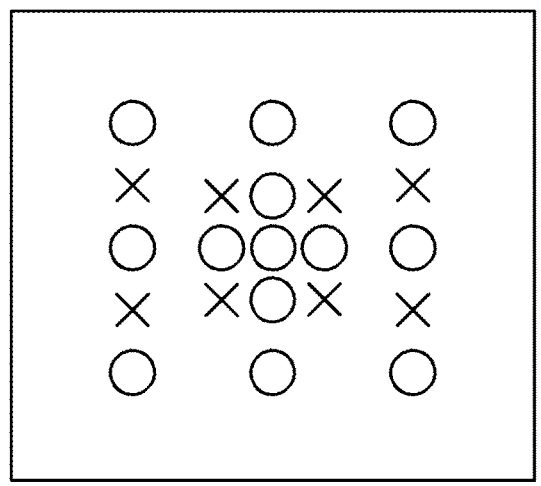
FIG. 17 is a schematic illustration of another alternative arrangement of the protruding regions of FIG. 13.
Figure 18:
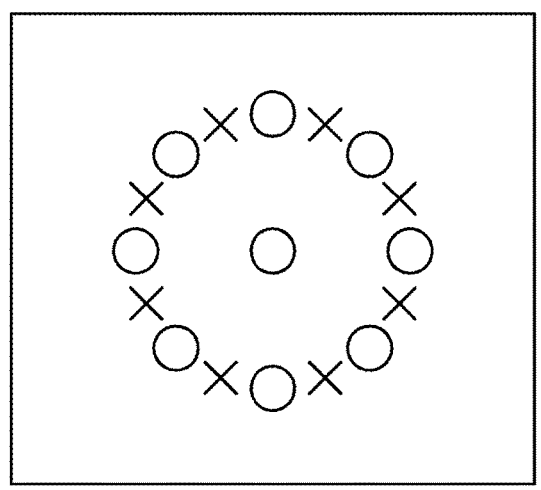
FIG. 18 is a schematic illustration of another alternative arrangement of the protruding regions of FIG. 13.

In the embodiments illustrated in FIGS. 13-16, the first and second protruding regions 433, 434 are uniformly distributed across an area surrounded by the elastic member periphery. In other embodiments, the elastic member 430 includes first and second protruding regions 433, 434 that are concentrated in a central region of the area surrounded by elastic member periphery in order to provide relatively increased stiffness in this region. The non-uniform distribution of the first and second protruding regions 433, 434, in which the density of first protruding regions 433 and second protruding regions 434 is greater in a central region of the elastic member 430 than in a periphery of the elastic member 430, can be accomplished, for example by arranging a subset of the first protruding regions 433 in an alternating manner along a line with a subset of the second protruding regions 434. In some embodiments, the line is linear (FIG. 17), whereas in other embodiments, the line is curved (FIG. 18).

As an alternative to, or in addition to, adjusting the spring stiffness of the elastic member 430 by varying the distribution of the protruding regions 433, 434, it is possible to adjust the spring stiffness of the elastic member 430 by varying the shape of the protruding regions 433, 434. In the illustrated embodiments, the protruding regions 433, 434 are generally rectangular with sidewalls 437 that are generally perpendicular to the plane 435. The spring rate of the elastic member 430 can be decreased, for example, by providing protruding regions 433, 434 having sidewalls 437 that are less perpendicular to the plane 435. In other embodiments, the protruding regions 433, 434 have a cylindrical, conical or other shape. In addition, and/or alternatively, by providing an elastic member in which the geometry of the protrusions 433, 434 varies across the area surrounded by the elastic member periphery, the spring rate of the elastic member can be made to vary across the area surrounded by the elastic member periphery.

Figure 19:
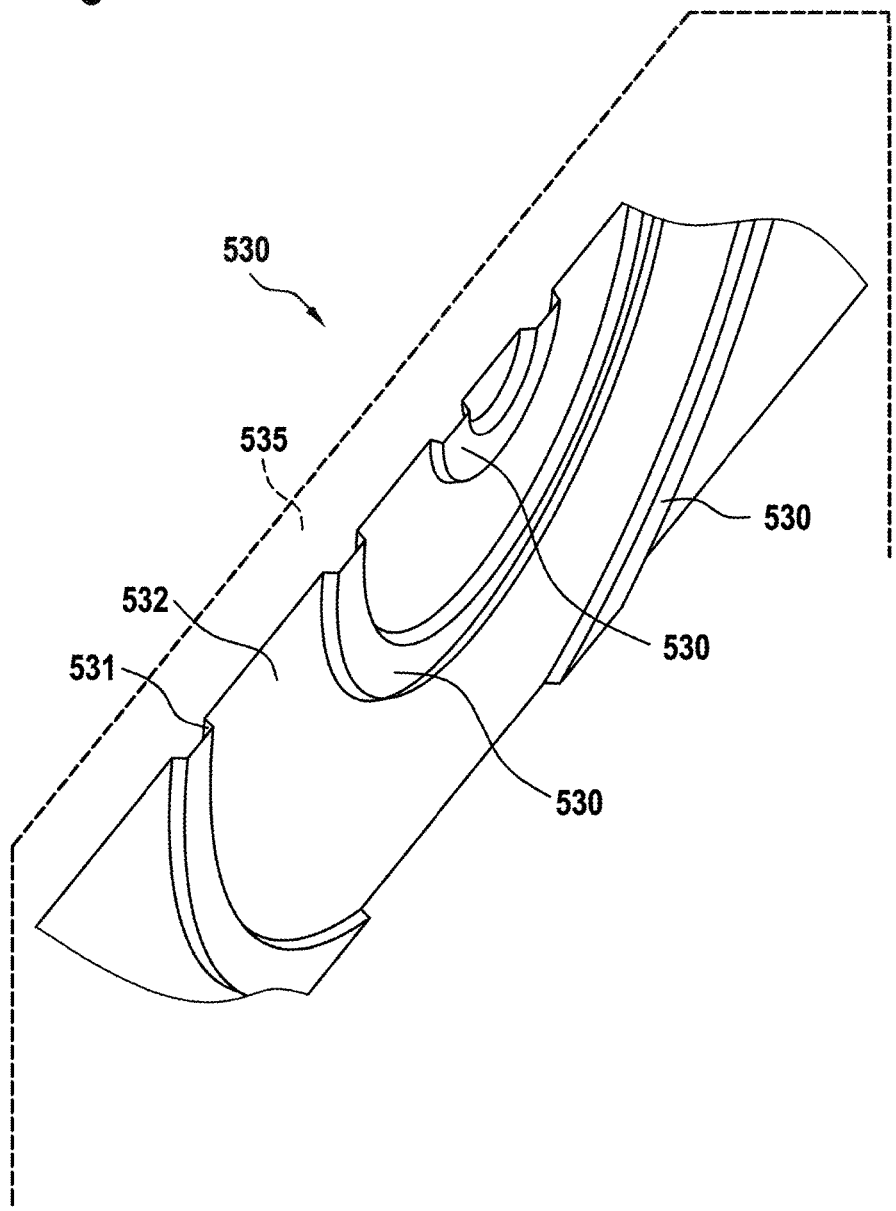
FIG. 19 is a perspective cross-sectional view of another embodiment elastic member.
Figure 20:
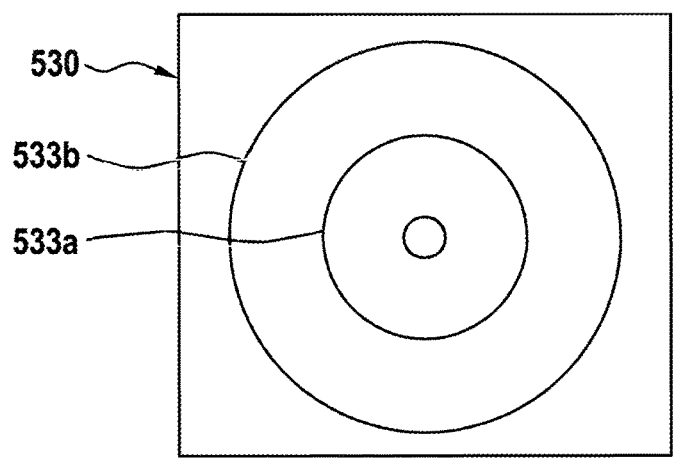
FIG. 20 is a schematic illustration of an alternative arrangement of the protruding regions of FIG. 19.

Referring to FIGS. 19-20, another alternative embodiment elastic member 530 is a plate (e.g., a single-thickness sheet) that is formed having a curved or wavy contour when seen in cross-section. Like the previously described embodiments, the elastic member 530 serves as compression spring. The elastic member 530 defines a continuous (e.g., non-perforated) surface that conforms to the shape and size of the cell first and second sides 21, 22. In particular, the elastic member 530 includes a first side 531, and a second side 532 that is opposed to the first side 531. The elastic member 530 includes an array of protruding regions 533 that protrude outwardly from the second side 532 and coincides with a depression formed in the first side 531.

Figure 21:
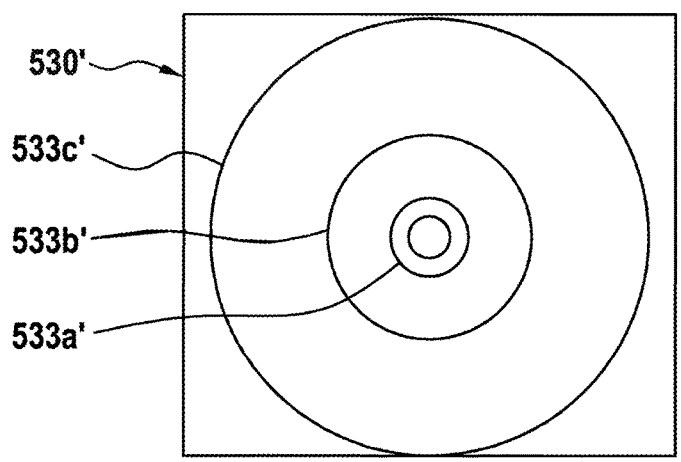
FIG. 21 is a schematic illustration of another alternative arrangement of the protruding regions of FIG. 19.

The elastic member 530 generally resides within a plane 535. The protruding regions 533 are annular and arranged concentrically, and protrude out of the plane 535 in a direction normal to the second side 532. In some embodiments, the annular, concentric protruding regions 533 are arranged in a uniformly distributed pattern within the area surrounded by the elastic member periphery, for example by providing equal spacing between adjacent protruding regions 533a, 533b (FIG. 20). In other embodiments, the annular, concentric protruding regions 533' are arranged in a non-uniformly distributed pattern within the area surrounded by the elastic member periphery by providing unequal spacing between adjacent protruding regions 533a', 533b'. For example, the annular protruding regions 533a', 533b' may more closely spaced in a central region of the elastic member relative to annular protruding regions 533c' in the periphery in order to provide relatively increased stiffness in the central region (FIG. 21).

Figure 22:
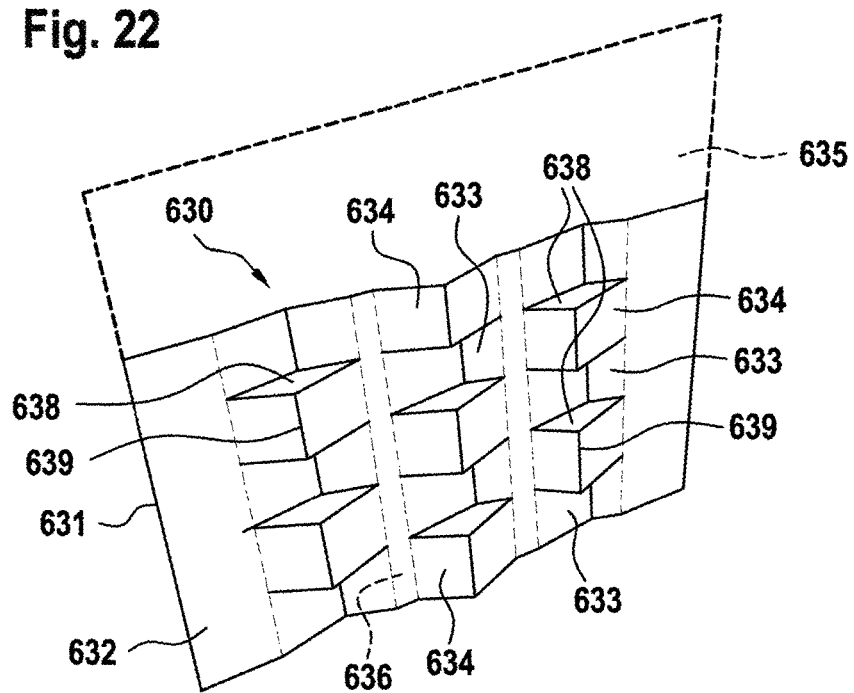
FIG. 22 is a perspective view of another embodiment elastic member.
Figure 23:
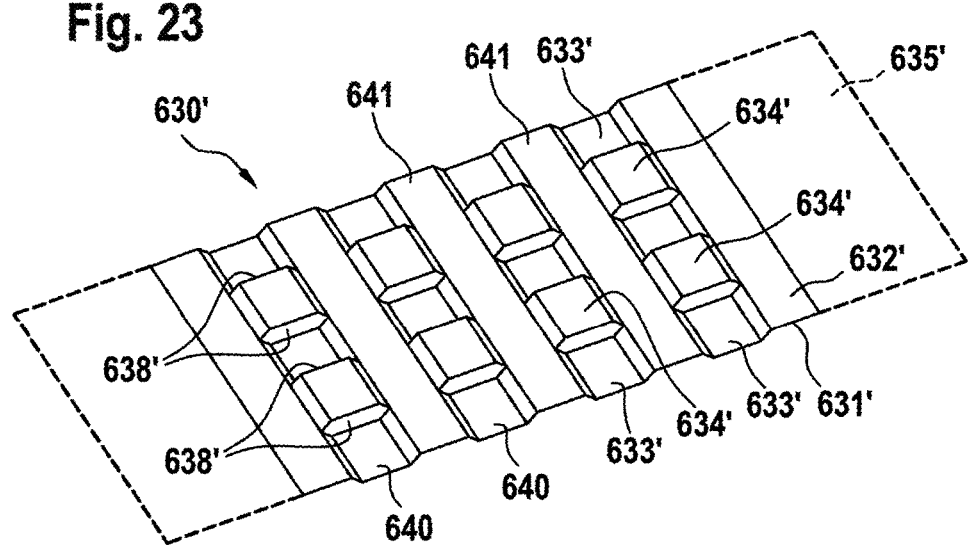
FIG. 23 is a perspective view of another embodiment elastic member.

Referring to FIGS. 22-23, another alternative embodiment elastic member 630 is a plate (e.g., a single-thickness sheet) that is formed having a curved or wavy contour when seen in cross-section and that conforms to the shape and size of the cell first and second sides 21, 22. Like the previously described embodiments, the elastic member 630 serves as compression spring. The elastic member 630 includes a first side 631, and a second side 632 that is opposed to the first side 631. The elastic member 630 includes an array of first protruding regions 633 and an array of second protruding regions 634. Each first protruding region 633 is a protrusion that protrudes outwardly from the first side 631 and coincides with a depression formed in the second side 532. Similarly, each second protruding region 634 is a protrusion that protrudes outwardly from the second side 532 that coincides with a depression formed in the first side 634.

The elastic member 630 generally resides within a plane 635. The first protruding regions 633 protrude out of the plane 635 in a first direction (e.g., in a direction normal to the first side 631), and the second protruding regions 634 protrude out of the plane 635 in a direction opposed to the first direction. The first protruding regions 633 and the second protruding regions 634 are spaced apart from each other, and the portions 636 of the elastic member 630 intermediate the protruding regions 633, 634 reside in the plane 635.

Unlike the wavy contoured sheets illustrated in FIG. 13-21, the elastic member 630 has a perforated surface. In particular, The elastic member 630 includes perforations (e.g., elongated, linear openings or slits) 638 that are formed along a transition between intermediate (e.g. in-plane) portions 636 of the elastic member 630 and the first protruding regions 633 and along a transition between intermediate portions 636 of the elastic member 630 and the second protruding regions 634. The perforations 638 are formed on opposed sides of each of the first protruding regions 633 and the second protruding regions 644. By providing an elastic member 630 in which the protruding regions are associated with perforations 638, the elastic member 630 may have reduced weight and increased compliance relative to a continuous elastic member such as is illustrated in FIG. 13.

In some embodiments, the elastic member 630 may be slightly pleated in an accordion manner. The first protruding regions 633 and the second protruding regions 634 are arranged on alternating fold lines 639 of the pleat, and the perforations 638 are slits that extend transversely across the fold lines 639 of the pleat. In these embodiments, the first and second protrusions 633, 634 have a profile corresponding to a triangular prism (FIG. 22).

In some embodiments, the elastic member 630' may be corrugated (e.g., may have alternating ridges 641 and grooves 640). The first protruding regions 633' and the second protruding regions 634' are arranged on alternating grooves 640, and the perforations 638' are slits that extend transversely across the grooves 640. In the corrugated embodiment, the first and second protrusions 633', 634' have a profile corresponding to a trapezoid (FIG. 20) and protrude outwardly relative to the ridges 641.

The plates, including the first plate portion 331, the second plate portion 332, and those used to form elastic members 430, 530, 630 are formed of a material that is sufficiently elastic to serve as a compression spring and sufficiently rigid and plastic to permit shaping in a press. For example, the material used to form the first plate portion may selected from the group including, but not limited to, metal (steel, aluminum, copper, etc.), polymer (plastic), and elastomer (synthetic rubber material).

Although the cell 20 is described herein as having a prismatic shape, the cell 20 is not limited to this shape. For example, the cell may have a circular, elliptical, pouch or other shape.

Although the cell 20 is described herein as being a lithium-ion cell, the cell 20 is not limited to this type. For example, the cell 20 may be an alkaline cell, aluminum-ion cell, nickel metal hydride cell or other type of cell.

The elastic members 30 are not limited to use between adjacent cells 20a, 20b, and may be adapted to provide support and compliance between adjacent modules 15 and/or subunits 14, and may also be adapted to permit support and compliance between a cell 20, a module 15 or a subunit 14 and the battery pack housing 12.

The elastic members 30 may include the two sheets of material 31, 131, 231 and 32, 132, 232 that may be joined at strategic locations using sealed lines 34, 134, 136, 234, 236 formed using known methods including heating, welding or adhesives. In alternative embodiments, the two sheets of material 31, 131, 231 and 32, 132, 232 may be joined via an intermediate structure such as webbing.

Selective illustrative embodiments of the elastic member are described above in some detail. It should be understood that only structures considered necessary for clarifying the elastic member have been described herein. Other conventional structures, and those of ancillary and auxiliary components of the battery system, are assumed to be known and understood by those skilled in the art. Moreover, while working examples of the elastic member been described above, the elastic member is not limited to the working examples described above, but various design alterations may be carried out without departing from the device as set forth in the claims.

What is claimed is:
1. A battery stack comprising
a first cell,
a second cell positioned adjacent the first cell in a stacked arrangement with the first cell, the first and second cells each including
a cell housing,
a positive electrode, and
a negative electrode,
the positive electrode and the negative electrode sealed within the cell housing along with an electrolyte, and
an elastic member disposed between the first cell and the second cell, the elastic member comprising
a first sheet,
a second sheet layered with the first sheet,
wherein
the first sheet and the second sheet are joined along a first sealed line that forms a peripheral edge of the elastic member,
the first sheet and the second sheet are joined along a second sealed line that is spaced apart from the peripheral edge, the second sealed line forming a closed shape,
a first interior space is defined between the first sheet, the second sheet, the first sealed line and the second sealed line,
a second interior space is defined between the first sheet, the second sheet and within the second sealed line,
the first interior space is at least partially inflated, and the second interior space is less inflated than the first interior space, and
the elastic member is free of a fluid inlet and a fluid outlet.

2. The battery stack of claim 1, wherein the second sealed line surrounds an opening in the elastic element.

3. The battery stack of claim 1, wherein the first sheet and the second sheet are joined along second sealed lines that are spaced apart from the common peripheral edge, each second sealed line defining a second interior space, wherein all of the all of the second interior spaces have the same shape.

4. The battery stack of claim 1, wherein the first sheet and the second sheet are joined along second sealed lines that are spaced apart from the common peripheral edge, each second sealed line defining a second interior space, wherein all of the all of the second interior spaces have the same size.

5. The battery stack of claim 1, wherein the second interior spaces are distributed uniformly across an area defined by the peripheral edge.

6. The battery stack of claim 1, wherein the second interior spaces are concentrated in a central region of an area defined by the peripheral edge.

7. The battery stack of claim 1, wherein the elastic member is configured to apply a compression force to a surface of the cell housing of each of the first cell and the second cell.

8. The battery stack of claim 7, wherein the elastic member is configured such that the applied compression force is greater in a central region of the surface than in a peripheral region of the surface.

9. A battery module comprising
a cell support element;
a first cell supported on the cell support element,
a second cell supported on the cell support element, the second cell positioned adjacent the first cell in a stacked arrangement with the first cell, the first and second cells each including
a cell housing,
a positive electrode, and
a negative electrode, the positive electrode and the negative electrode sealed within the cell housing along with an electrolyte, and an elastic member disposed between the first cell and the second cell, the elastic member comprising a first sheet, a second sheet layered with the first sheet, wherein the first sheet and the second sheet are joined along a first sealed line that forms a peripheral edge of the elastic member, the first sheet and the second sheet are joined along a second sealed line that is spaced apart from the peripheral edge, the second sealed line forming a closed shape, a first interior space is defined between the first sheet, the second sheet, the first sealed line and the second sealed line, a second interior space is defined between the first sheet, the second sheet and within the second sealed line, the first interior space is at least partially inflated, and the second interior space is less inflated than the first interior space, and the elastic member is free of a fluid inlet and a fluid outlet.

10. The battery module of claim 9, wherein the second sealed line surrounds an opening in the elastic element.

11. The battery module of claim 9, wherein the first sheet and the second sheet are joined along second sealed lines that are spaced apart from the common peripheral edge, each second sealed line defining a second interior space, wherein all of the all of the second interior spaces have the same shape.

12. The battery module of claim 9, wherein the first sheet and the second sheet are joined along second sealed lines that are spaced apart from the common peripheral edge, each second sealed line defining a second interior space, wherein all of the all of the second interior spaces have the same size.

13. The battery module of claim 9, wherein the second interior spaces are distributed uniformly across an area defined by the peripheral edge.

14. The battery module of claim 9, wherein the second interior spaces are concentrated in a central region of an area defined by the peripheral edge.

15. A battery pack comprising a battery pack housing;

a first cell disposed in the housing, a second cell disposed in the housing, the second cell positioned adjacent the first cell in a stacked arrangement, the first and second cells each including a cell housing, a positive electrode, and a negative electrode, the positive electrode and the negative electrode sealed within the cell housing along with an electrolyte, and an elastic member disposed between the first cell and the second cell, the elastic member comprising a first sheet, a second sheet layered with the first sheet, wherein the first sheet and the second sheet are joined along a first sealed line that forms a peripheral edge of the elastic member, the first sheet and the second sheet are joined along a second sealed line that is spaced apart from the peripheral edge, the second sealed line forming a closed shape, a first interior space is defined between the first sheet, the second sheet, the first sealed line and the second sealed line, a second interior space is defined between the first sheet, the second sheet and within the second sealed line, the first interior space is at least partially inflated, and the second interior space is less inflated than the first interior space, and the elastic member is free of a fluid inlet and a fluid outlet.

16. The battery pack of claim 15, wherein the second interior spaces are distributed uniformly across an area defined by the peripheral edge.

17. The battery pack of claim 15, wherein the second interior spaces are concentrated in a central region of an area defined by the peripheral edge.

* * * * *